(12) United States Patent
Miura et al.

(10) Patent No.: US 8,733,076 B2
(45) Date of Patent: May 27, 2014

(54) ASSEMBLING METHOD FOR TORQUE TRANSMISSION CHAIN

(75) Inventors: Yoshihisa Miura, Yamatokoriyama (JP); Teruko Nagaoka, Settsu (JP)

(73) Assignee: JTEKT Corporation, Osaka (JP)

(*) Notice: Subject to any disclaimer, the term of this patent is extended or adjusted under 35 U.S.C. 154(b) by 229 days.

(21) Appl. No.: 13/390,423

(22) PCT Filed: Sep. 22, 2010

(86) PCT No.: PCT/JP2010/066418
§ 371 (c)(1),
(2), (4) Date: Feb. 14, 2012

(87) PCT Pub. No.: WO2011/037141
PCT Pub. Date: Mar. 31, 2011

(65) Prior Publication Data
US 2012/0167540 A1 Jul. 5, 2012

(30) Foreign Application Priority Data

Sep. 24, 2009 (JP) .................................. 2009-219390

(51) Int. Cl.
*B21L 9/06* (2006.01)
*F16G 13/06* (2006.01)

(52) U.S. Cl.
USPC .......... 59/35.1; 59/7; 59/8; 474/214; 474/215

(58) Field of Classification Search
USPC .............. 59/1, 6, 7, 8, 29, 35.1; 474/214, 215
See application file for complete search history.

(56) References Cited

U.S. PATENT DOCUMENTS

| | | | | |
|---|---|---|---|---|
| 7,140,173 B2* | 11/2006 | Van Rooij | ............................ | 59/7 |
| 7,441,396 B2* | 10/2008 | Fuse | ................................... | 59/7 |
| 7,617,668 B2* | 11/2009 | Miura | ................................. | 59/8 |
| 7,757,473 B2* | 7/2010 | Fuse | .............................. | 59/35.1 |
| 7,775,030 B2* | 8/2010 | Yasuhara et al. | ..................... | 59/8 |

(Continued)

FOREIGN PATENT DOCUMENTS

| | | |
|---|---|---|
| CN | 101027146 A | 8/2007 |
| EP | 1555455 A2 | 7/2005 |

(Continued)

OTHER PUBLICATIONS

Feb. 25, 2013 Extended European Search Report issued in European Patent Application No. 10818814.5.

(Continued)

*Primary Examiner* — David B Jones
(74) *Attorney, Agent, or Firm* — Oliff PLC

(57) ABSTRACT

An assembling method for a torque transmission chain, including a step of manufacturing split pieces of the chain in such a manner that a predetermined number of pins are held by a linear pin holding jig and then a predetermined number of links are press-fitted to the pins; a step of linearly arranging the split pieces so as to overlap split piece coupling links each arranged at any one of both ends of each of the split pieces; a step of inserting the pin through the overlapped split piece coupling links; and a step of pulling both ends of a whole of the plurality of split pieces coupled to each other via the split piece coupling links to thereby fix the pin to a pin fixing portion of the split piece coupling links.

4 Claims, 18 Drawing Sheets

(56) References Cited

U.S. PATENT DOCUMENTS

| | | | |
|---|---|---|---|
| 7,882,689 B2* | 2/2011 | Tada et al. ............... | 59/35.1 |
| 8,038,559 B2* | 10/2011 | Tada et al. ............... | 59/35.1 |
| 2007/0265125 A1 | 11/2007 | Fuse | |

FOREIGN PATENT DOCUMENTS

| | | |
|---|---|---|
| EP | 1 806 187 A1 | 7/2007 |
| EP | 2090805 A1 | 8/2009 |
| JP | U-7-1350 | 1/1995 |
| JP | A-2005-172023 | 6/2005 |
| JP | A-2006-2783 | 1/2006 |
| JP | A-2006-9921 | 1/2006 |
| JP | A-2006-95531 | 4/2006 |
| JP | A-2006-116562 | 5/2006 |
| JP | A-2006-116563 | 5/2006 |
| JP | A-2007-167931 | 7/2007 |
| KR | 10-2007-0051369 A | 5/2007 |
| WO | WO 2006/035819 A1 | 4/2006 |

OTHER PUBLICATIONS

International Search Report issued in International Patent Application No. PCT/JP2010/066418 dated Nov. 9, 2010.

* cited by examiner

ASSEMBLING METHOD FOR TORQUE TRANSMISSION CHAIN

TECHNICAL FIELD

The invention relates to an assembling method for a torque transmission chain and, more particularly, to an assembling method for a torque transmission chain that is suitable for a continuously variable transmission (CVT) of a vehicle, such as an automobile.

BACKGROUND ART

There is known a torque transmission chain suitable for a continuously variable transmission for an automobile, which includes a plurality of links having pin insertion portions through which pins are inserted and a plurality of pins that couple the links arranged in the chain widthwise direction. Patent Document 1 describes the assembling method that arranges a desired number of pins on a pin holding jig at a predetermined pitch to hold the pins in an arranged state where the pins are assembled as a chain and then sequentially press-fit links to these pins to thereby obtain an endless chain.

RELATED ART DOCUMENT

Patent Document

Patent Document 1: Japanese Patent Application Publication No. 2005-172023

SUMMARY OF THE INVENTION

Problems to be Solved by the Invention

In a torque transmission chain of this type, two or more types of the interval (pitch length) at which pins contact with a pulley are provided by changing the link shape, and the links having different pitch lengths are arranged randomly to thereby obtain a noise reduction effect. However, with the existing assembling method, when it is required to change the arrangement of the links, the whole pin holding jig needs to be changed to a new one, so it is a challenge to increase the efficiency of assembling man-hour to thereby improve workability.

One of objects of the invention is to provide an assembling method for a torque transmission chain, which is able to increase the efficiency of assembling man-hour to thereby improve workability in order to assemble the torque transmission chain in which two or more types of links having different pitch lengths are used and these links are randomly arranged.

Means for Solving the Problems

An assembling method for a torque transmission chain according to an aspect of the invention is a method of assembling a torque transmission chain that has a plurality of links each having a pin insertion portion through which a pin is inserted and a plurality of pins that couple the links arranged in a chain widthwise direction, wherein the links have at least two pitch lengths, and the links having different pitch lengths are randomly arranged. The assembling method includes: a step of manufacturing split pieces of the chain in such a manner that a predetermined number of pins are held by a linear pin holding jig and then a predetermined number of links are press-fitted to the pins; a step of linearly arranging the split pieces so as to overlap split piece coupling links each arranged at any one of both ends of each of the split pieces; a step of inserting the pin through the overlapped split piece coupling links; and a step of pulling both ends of a whole of the plurality of split pieces coupled to each other via the split piece coupling links to thereby fix the pin to a pin fixing portion of the split piece coupling links. With the above assembling method for a torque transmission chain, it is possible to increase the efficiency of assembling man-hour to thereby improve workability.

EMBODIMENTS OF THE INVENTION

Hereinafter, an embodiment of the invention will be described with reference to the drawings. In the following description, upper and lower sides mean the upper and lower sides of FIG. 2.

Figure 1:
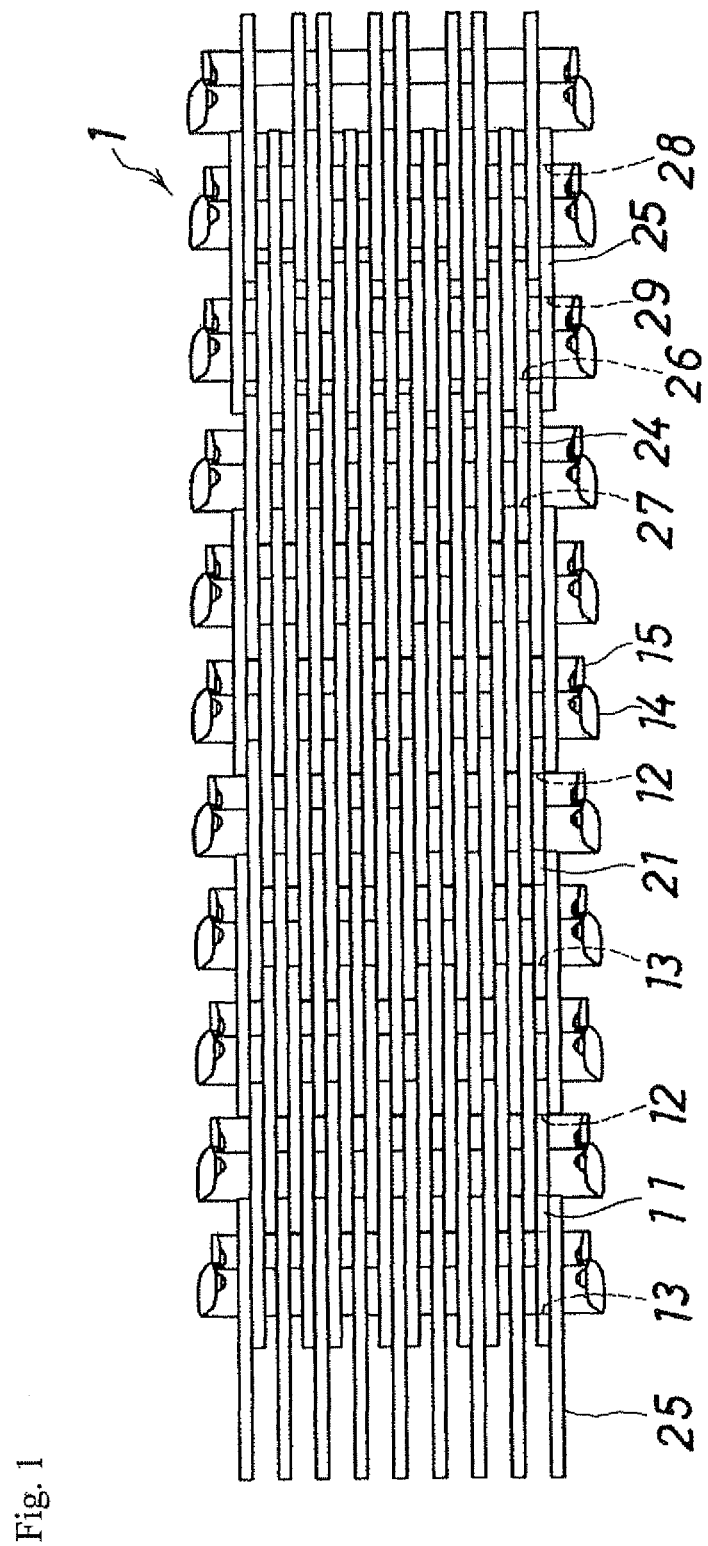
FIG. 1 is a plan view that shows part of a torque transmission chain that is manufactured by an assembling method for a torque transmission chain according to one embodiment of the invention.

FIG. 1 shows part of a torque transmission chain according to the invention. The torque transmission chain 1 includes a plurality of links 11, 21, 24 and 25 provided at predetermined intervals in the chain longitudinal direction and a plurality of pins (first pins) 14 and interpieces (second pins) 15 that couple the links 11, 21, 24 and 25 arranged in the chain widthwise direction so as to be bendable in the longitudinal direction. Each of the links 11 and the links 21 has a front insertion portion 12 and a rear insertion portion 13. Each link 24 has a front insertion portion 26 and a rear insertion portion 27. Each link 25 has a front insertion portion 28 and a rear insertion portion 29. The interpieces 15 are shorter than the pins 14. Both face each other in a state where the interpiece 15 is arranged on the front side and a corresponding one of the pins 14 is arranged on the rear side.

Figure 2:
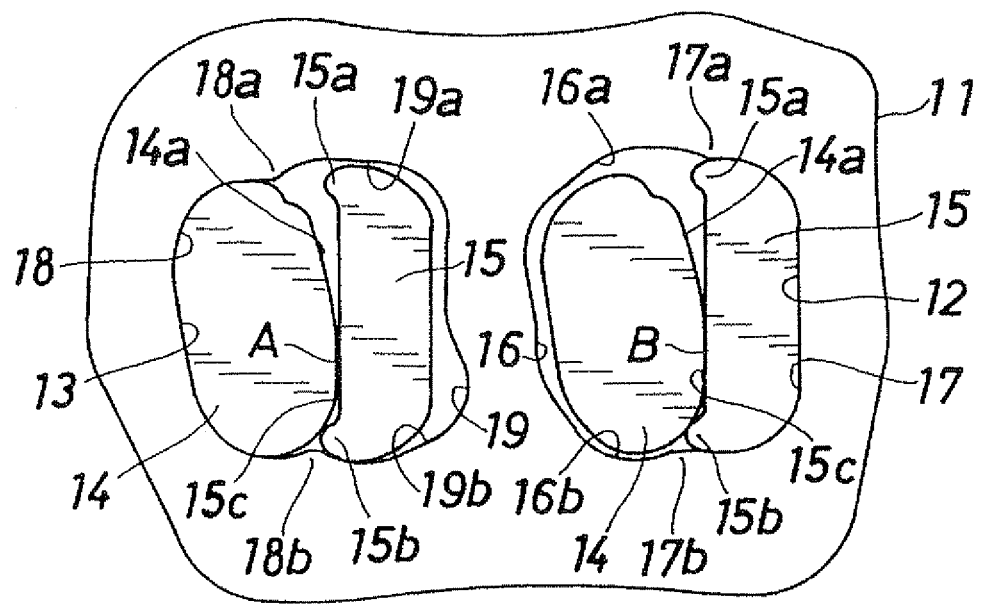
FIG. 2 is an enlarged side view of a normal link that is used in the torque transmission chain shown in FIG. 1.
Figure 3:
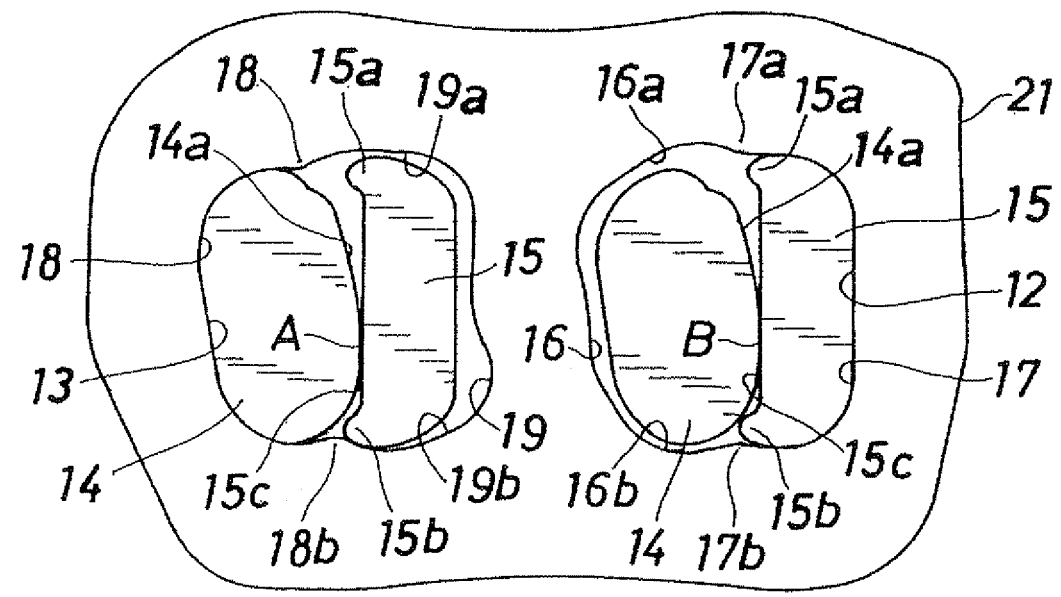
FIG. 3 is an enlarged side view of a link that is used in the torque transmission chain shown in FIG. 1 and that has a different pitch length from the normal link.
Figure 6A:
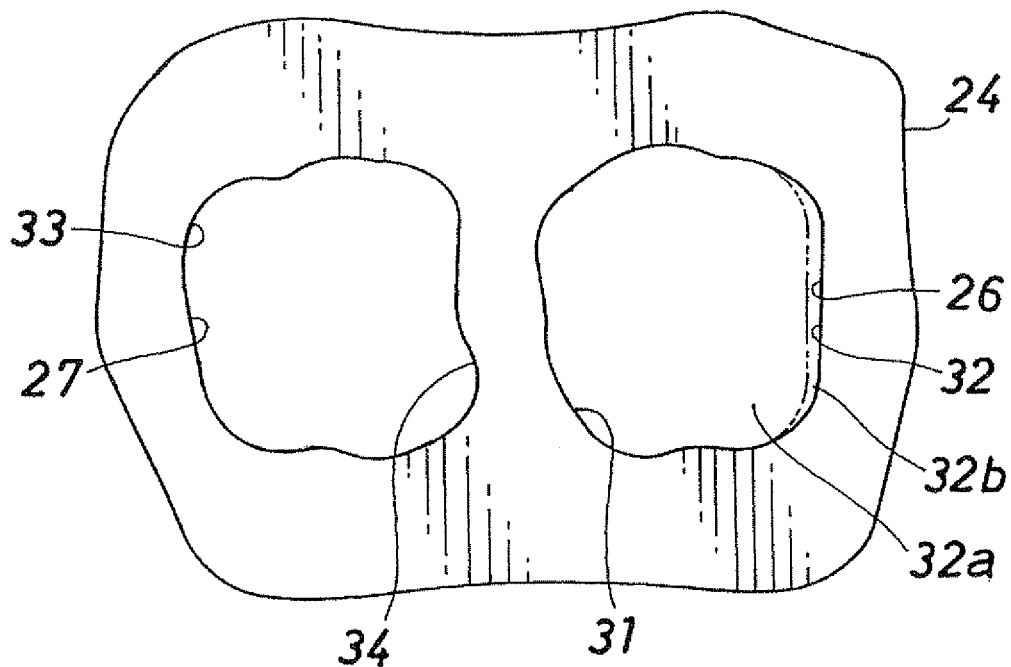
FIG. 6A is an enlarged side view of a front end arranged split piece coupling link between two types of split piece coupling links.
Figure 6B:
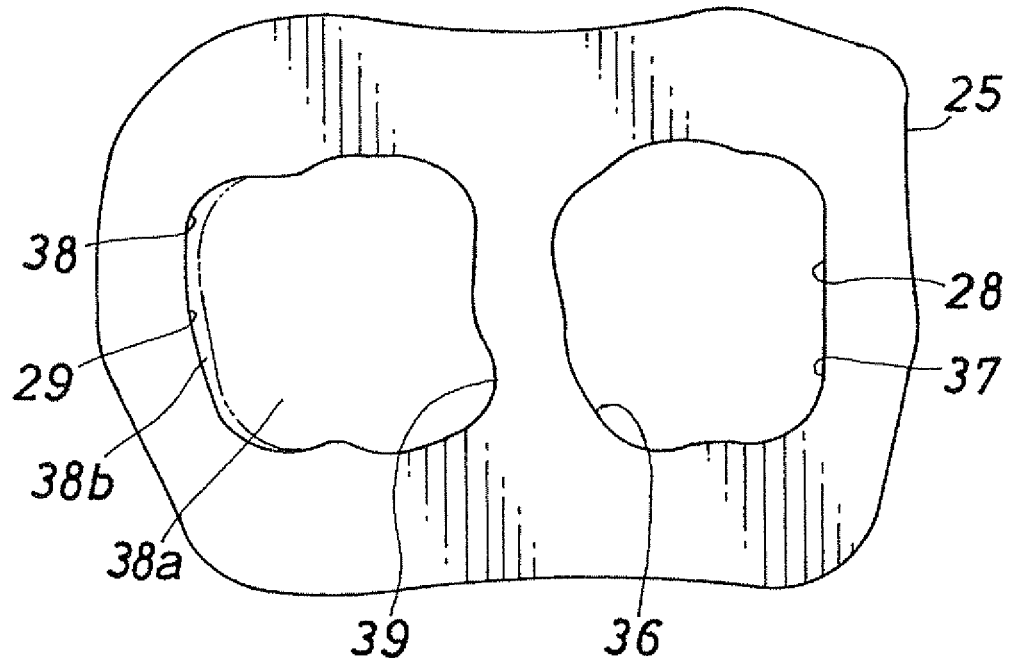
FIG. 6B is an enlarged side view of a rear end arranged split piece coupling link between two types of split piece coupling links.

In the torque transmission chain 1 of the invention, for the links 11, 21, 24 and 25, two types of random arrangement links 11 and 21 shown in FIG. 2 and FIG. 3 and two types of split piece coupling links 24 and 25 shown in FIG. 6A and FIG. 6B are used.

The chain 1 is formed in such a manner that three link rows, each of which is formed of a plurality of the links 11, 21, 24 or 25 having the same phase in the widthwise direction, are arranged in a travelling direction (front-rear direction) to form a single link unit and then a plurality of the link units, each of which is formed of the three link rows, are coupled in the travelling direction. In this embodiment, a link row formed of nine links and two link rows each formed of eight links form a single link unit.

The front insertion portion 12 of each of the random arrangement links 11 and 21 is formed of a pin movable portion 16 to which the pin 14 is movably fitted and an interpiece fixing portion 17 to which the interpiece 15 is fixed, and the rear insertion portion 13 is formed of a pin fixing portion 18 to which the pin 14 is fixed and an interpiece movable portion 19 to which the interpiece 15 is movably fitted.

Each pin 14 has a width wider in the front-rear direction than that of each interpiece 15, and protruding edge portions 15a and 15b that extend toward the pin 14 are provided at the upper and lower edge portions of the interpiece 15.

In order to couple the links 11, 21, 24 and 25, the links 11, 21, 24 and 25 are overlapped with each other in such a manner that the front insertion portion 12, 26 or 28 of one of the links 11, 21, 24 and 25 corresponds to the rear insertion portion 13, 27 or 29 of another one of the links 11, 21, 24 and 25, the pin 14 is fixed to the rear insertion portion 13, 27 or 29 of one of the links 11, 21, 24 and 25 and is movably fitted to the front insertion portion 12, 26 or 28 of another one of the links 11, 21, 24 and 25, and the interpiece 15 is movably fitted to the rear insertion portion 13, 27 or 29 of one of the links 11, 21, 24 and 25 and is fixed to the front insertion portion 12, 26 or 28 of another one of the links 11, 21, 24 and 25. Then, the pins 14 and the interpieces 15 relatively move in rolling contact with each other to thereby allow the links 11, 21, 24 and 25 to bend in the longitudinal direction (front-rear direction).

As shown in FIG. 2 and FIG. 3, upper and lower convex circular arc holding portions 18a and 18b that are respectively continuous with upper and lower concave circular arc guide portions 19a and 19b of the interpiece movable portion 19 and that hold the pin 14 fixed to the pin fixing portion 18 are provided at the boundary portions between the pin fixing portion 18 and interpiece movable portion 19 of each of the links 11 and 21. Similarly, upper and lower convex circular arc holding portions 17a and 17b that are respectively continuous with upper and lower concave circular arc guide portions 16a and 16b of the pin movable portion 16 and that hold the interpiece 15 fixed to the interpiece fixing portion 17 are provided at the boundary portions between the interpiece fixing portion 17 and the pin movable portion 16.

The trajectory of the contact position between each pin 14 and a corresponding one of the interpieces 15 with reference to the pin 14 forms an involute of circle. In this embodiment, the rolling contact surface 14a of the pin 14 forms an involute curve that has a base circle of a radius Rb and a center M in cross section, and the rolling contact surface 15c of the interpiece 15 forms a flat surface (straight line in sectional shape). By so doing, at the time of the transition of each of the links 11, 21, 24 and 25 from the straight region of the chain 1 to the curved region of the chain 1 or the transition from the curved region to the straight region, in the front insertion portion 12, 26 or 28, the pin 14 moves within the pin movable portion 16 with respect to the fixed interpiece 15 while the rolling contact surface 14a of the pin 14 is in rolling contact (including slight sliding contact) with the rolling contact surface 15c of the interpiece 15, and, in the rear insertion portion 13, 27 or 29, the interpiece 15 moves within the interpiece movable portion 19 with respect to the fixed pin 14 while the rolling contact surface 15c is in rolling contact (including slight sliding contact) with the rolling contact surface 14a of the pin 14.

In the torque transmission chain 1, polygonal vibration occurs because of repeated up and down movement of the pins, and this becomes a factor of noise; however, each pin 14 and a corresponding one of the interpieces 15 move relatively in rolling contact with each other, and the trajectory of the contact position between the pin 14 and the interpiece 15 with reference to the pin 14 forms an involute of circle, so, in comparison with the case where both the contact surfaces of the pin and interpiece are circular arc surfaces, or the like, vibration may be reduced, and noise may be reduced.

In order to further reduce noise and vibration, it is desirable that two or more types of links 11 and 21 having different shapes are randomly arranged. By so doing, the period of occurrence of hitting noise deviates, the energy of sound is distributed among different frequency bands, and the peak of sound pressure level is reduced. As shown in FIG. 2 and FIG. 3, portions indicated by the reference signs A and B are lines (points in cross section) at which the pin 14 and the interpiece 15 contact in a straight region of the chain 1, and the distance between A and B is a pitch length. The link 21 shown in FIG. 3 is obtained such that the distance between A and B (pitch length) of the link 11 shown in FIG. 2 is increased. In the torque transmission chain 1, these links 11 having a short pitch length and links 21 having a long pitch length are randomly arranged, and, accordingly, the gap between the adjacent rolling contact surfaces 14a and 15c (which is the same as the gap between the adjacent pins 14 and the gap between the adjacent interpieces 15) is also randomly arranged.

The torque transmission chain 1 is, for example, used in a continuously variable transmission. In this case, as shown in FIG. 4, in a state where the end surfaces of the interpieces 15 are not in contact with the conical sheave surfaces 2c and 2d of fixed sheave 2a and movable sheave 2b of a pulley 2 having a pulley shaft 2e, the end surfaces of the pins 14 are in contact with the conical sheave surfaces 2c and 2d of the pulley 2, and torque is transmitted by friction force based on this contact.

Figure 4:
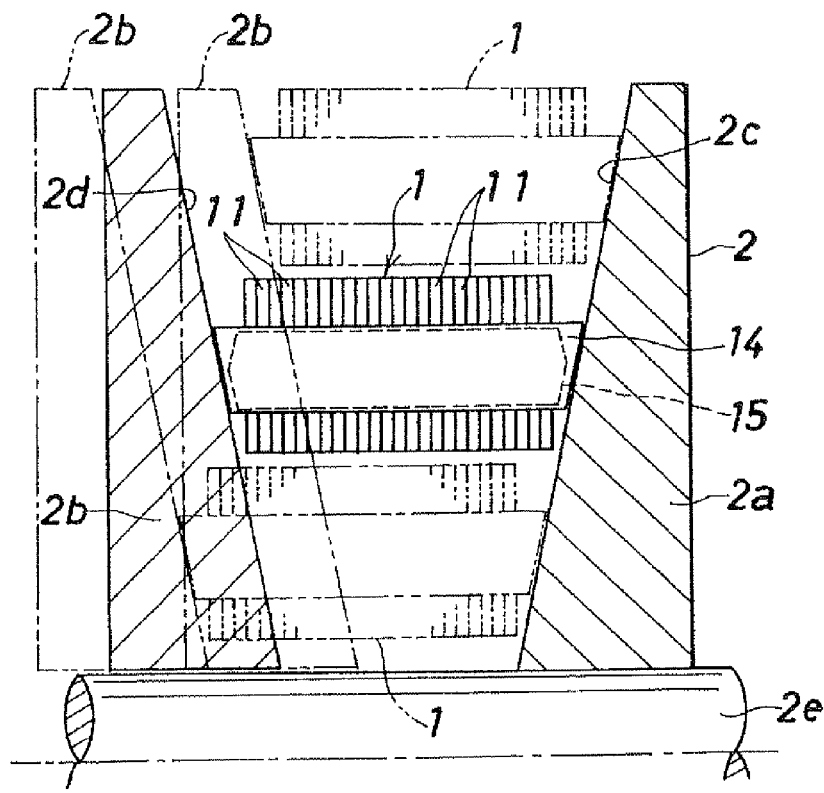
FIG. 4 is a front view that shows a state where the torque transmission chain shown in FIG. 1 is assembled to a pulley.

In FIG. 4, as the movable sheave 2b of the drive pulley 2, which is located at the position indicated by continuous line, is brought close to or away from the fixed sheave 2a, the winding diameter of the drive pulley 2 is large at the time when the movable sheave 2b is brought close to the fixed sheave 2a and is small at the time when the movable sheave 2b is brought away from the fixed sheave 2a as indicated by the dotted line in the drawing. Although not shown in the drawing, in a driven pulley, the movable sheave moves in a direction opposite to the movable sheave 2b of the drive pulley 2. As the winding diameter of the drive pulley 2 increases, the winding diameter of the driven pulley 3 reduces; whereas, as the winding diameter of the drive pulley 2 reduces, the winding diameter of the driven pulley 3 increases. As a result, a state where the speed ratio is 1:1, an U/D (under drive) state where the winding diameter of the drive pulley 2 is minimal and the winding diameter of the driven pulley 3 is maximal, or an O/D (over drive) state where the winding diameter of the drive pulley 2 is maximal and the winding diameter of the driven pulley 3 is minimal is obtained.

Employing the random arrangement of the links 11 and 21 causes an increase in assembling man-hour and deterioration of workability at the time of manufacturing the torque transmission chain 1. In this embodiment, in order to increase the efficiency of assembling man-hour and improve workability, the following assembling method for a torque transmission chain is employed.

As shown from FIG. 5 to FIG. 13 (FIG. 13A and FIG. 13B), the assembling method for a torque transmission chain includes: a step (split piece manufacturing step) of manufacturing split pieces 22 and 23 in such a manner that the torque transmission chain 1 is divided into a plurality of the split pieces 22 and 23, the pins 14 and the interpieces 15 are held by a linear pin holding jig 43 and then the links 11, 21, 24 and 25 are press-fitted; a step (split piece arranging step) of arranging the split piece coupling links 24 and 25 having the front insertion portion (pin insertion portion) 26 or rear insertion portion 29, having a larger front-rear length (split piece longitudinal size) than the front and rear insertion portions (pin insertion portions) 12 and 13 of the other links (random arrangement links) 11 and 21, at both ends of each of the split pieces 22 and 23; a step (split piece overlapping step) of linearly arranging the split pieces 22 and 23 such that the split piece coupling links 24 and 25 overlap with each other; a step (pin arranging step) of arranging the pins 14A and the interpieces 15A at desired positions by inserting the pins 14A and the interpieces 15A through the overlapped split piece coupling links 24 and 25; and a step (split piece pretensioning step) of pulling both ends of the whole of the plurality of split pieces 22 and 23, coupled to each other via the split piece coupling links 24 and 25, to thereby fix the pins 14A and the interpieces 15A in the front and rear insertion portions 26, 27, 28 and 29 of the split piece coupling links 24 and 25 and apply a pretension to the whole of the plurality of split pieces 22 and 23.

Figure 5:
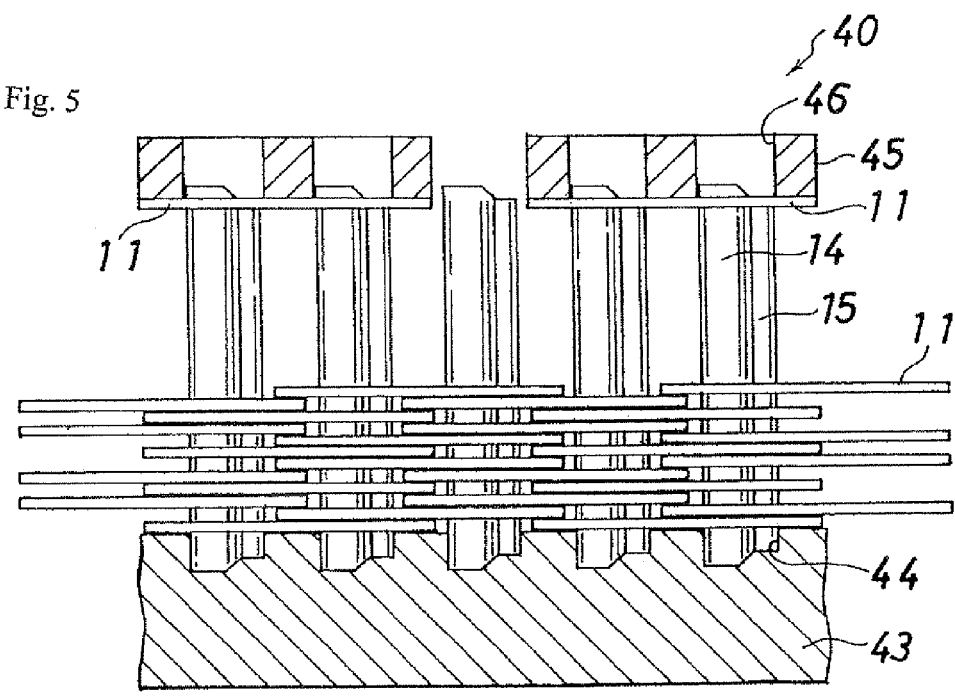
FIG. 5 is a vertical sectional view that shows a press-fitting device that is used in the assembling method for a torque transmission chain according to one embodiment of the invention.

In the split piece manufacturing step, as shown in FIG. 5, a press-fitting device 40 is used to sequentially press-fit a desired number of the random arrangement links 11 and 21 after a desired number of the pins 14 and the interpieces 15 are held by the linear pin holding jig 43 to thereby manufacture the split pieces 22 and 23. The press-fitting is performed between the upper and lower edge portions of each pin 14 and the upper and lower edge portions of the corresponding pin fixing portion 18 and between the upper and lower edge portions of each interpiece 15 and the upper and lower edge portions of the corresponding interpiece fixing portion 17, and each press-fit interference is set to range from 0.005 mm to 0.1 mm.

As shown in FIG. 5, the press-fitting device 40 includes the linear pin holding jig 43 that has a desired number of pin insertion holes 44 through which one ends of the pins 14 and interpieces 15 are insertable and link pressing jigs 45 that push the links 11 to predetermined positions of the pins 14 and interpieces 15.

The pin holding jig 43 is movable in the horizontal direction in the drawing. The pin insertion holes 44 of the pin holding jig 43 each have a closed end, and the bottom surface of each pin insertion hole 44 is stepped such that the end surfaces of the pins 14 projects from the end surfaces of the interpieces 15. The cross-sectional shape of each pin insertion hole 44 is substantially the same shape as those of the front and rear insertion portions 12 and 13 of each link 11, and fitting is set such that the pin 14 and the interpiece 15 are insertable and removable and the inserted pin 14 and interpiece 15 do not move.

The link pressing jigs 45 are used to press-fit the links 11 one by one, and are formed in a substantially rectangular plate-like shape that is slightly larger than the link 11. The link pressing jigs 45 each are provided with pin insertion holes 46 that extend therethrough. The cross-sectional shape of each pin insertion hole 46 is formed in substantially the same shape as those of the front and rear insertion portions 12 and 13 of each link 11, and fitting is set such that, when the link pressing jigs 45 are moved downward, the pin insertion holes 46 contact with the pins 14 and the interpieces 15 but do not interfere with the pins 14 or the interpieces 15.

At the time of manufacturing the split pieces 22 and 23, the pin holding jig 43 in which the pin insertion holes 44 corresponding to the arrangement of the links 11 and 21 of the split pieces 22 and 23 are arranged is used, and all the pins 14 and interpieces 15 that constitute the split pieces 22 and 23 are inserted in the pin insertion holes 44 of the pin holding jig 43. Subsequently, the links 11 and 21 are arranged at the upper ends of the pins 14 and interpieces 15, and the link pressing jigs 45 are lowered. After that, similarly, the links 11 and 21 are sequentially press-fitted, and, by so doing, the split pieces 22 and 23 are manufactured. The amount of lowering of the link pressing jigs 45 is controlled such that the first-layer links 11 and the second-layer links 11 are not brought into close contact with each other but a predetermined amount of gap is formed between the links 11 in the adjacent layers.

For each of the split pieces 22 and 23 having different arrangements of the links 11 and 21, the pin holding jig 43 is replaced with the one in which the pin insertion holes 44 corresponding to the arrangement of the links 11 and 21 of that split piece 22 or 23 are arranged, and the split piece 22 or 23 is manufactured in a similar procedure. In this way, through press-fitting using the linear pin holding jig 43, the plurality of split pieces 22 and 23 that constitute the torque transmission chain 1 are manufactured.

Subsequently, in order to couple the split piece 22 to the split piece 23, in the split piece arranging step shown in FIG.

Figure 7A:
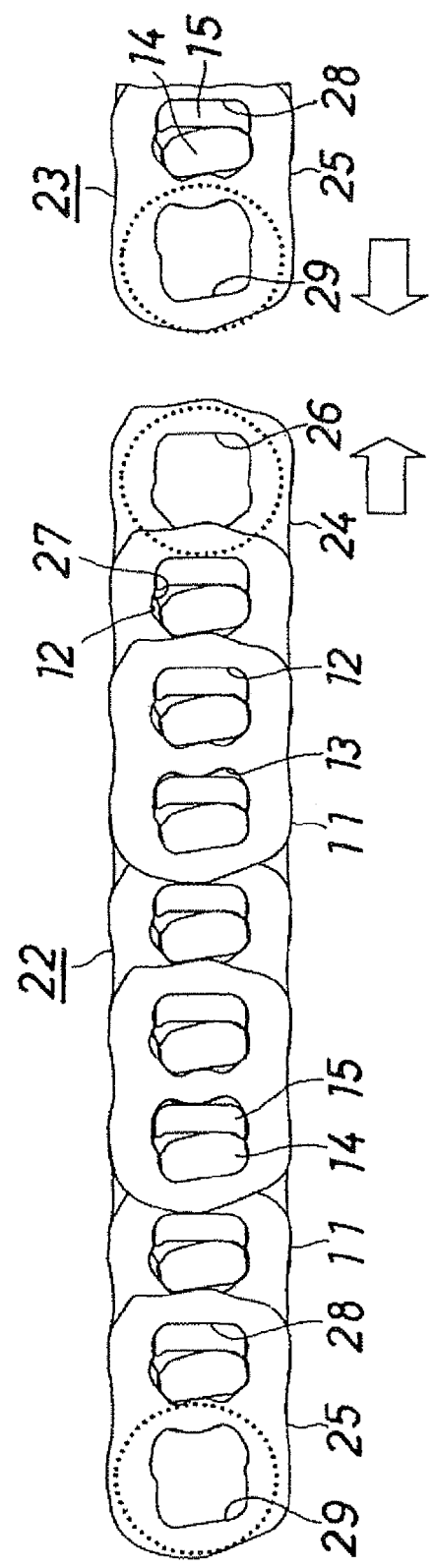
FIG. 7A is a side view that shows one step (split piece arranging step) of the assembling method for a torque transmission chain according to the invention.
Figure 7B:
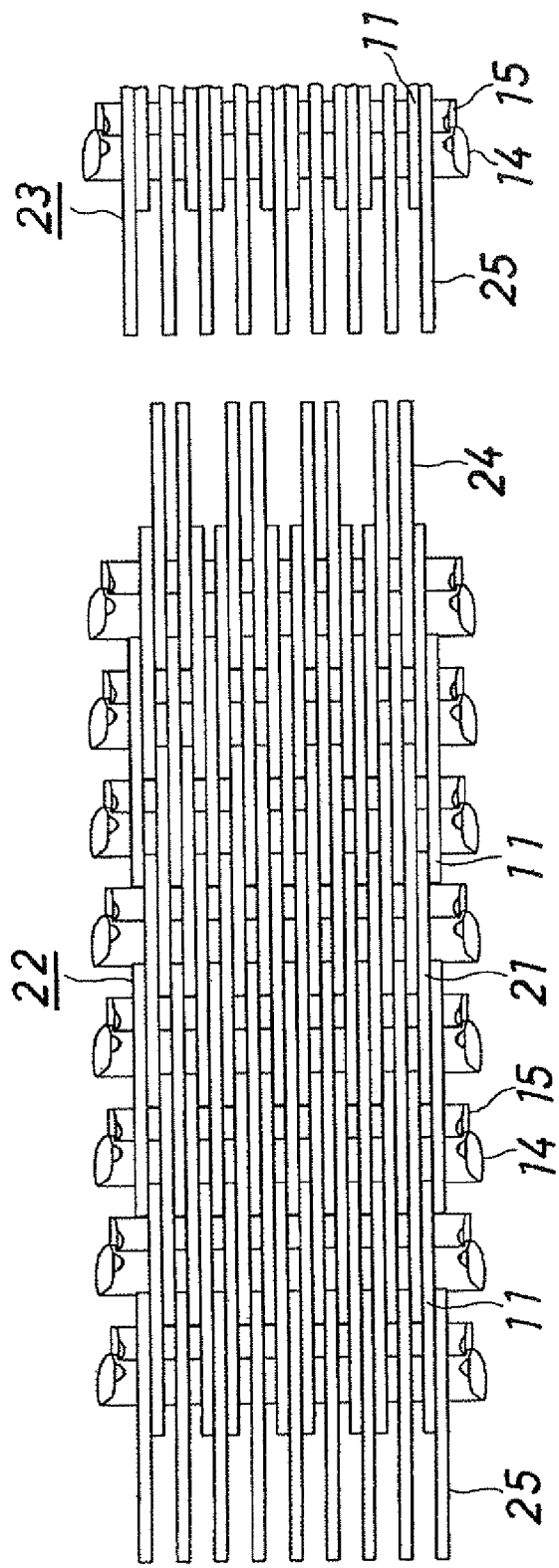
FIG. 7B is a plan view that shows one step (split piece arranging step) of the assembling method for a torque transmission chain according to the invention.

7A and FIG. 7B, the split piece coupling links 24 and 25 are arranged at both ends of each of the split pieces 22 and 23. The split piece coupling links 24 and 25 are formed in different shapes between the split piece coupling links 24 arranged at the front ends of the split pieces 22 and 23 and the split piece coupling links 25 arranged at the rear ends of the split pieces 22 and 23. Each front end arranged split piece coupling link 24 is formed to have the front insertion portion 26 having a large front-rear length with reference to the random arrangement link 11 shown in FIG. 2. Each rear end arranged split piece coupling link 25 is formed to have the rear insertion portion 29 having a large front-rear length with reference to the random arrangement link 11 shown in FIG. 2.

That is, as shown in FIG. 6A, the front insertion portion 26 of each front end arranged split piece coupling link 24 has a pin movable portion 31 to which the pin 14 is movably fitted and an interpiece fixing portion 32 to which the interpiece 15 is fixed, an extension portion 32b is added to the interpiece fixing portion 32 on the front side of a body portion 32a having the same size as that of the random arrangement link 11, and the rear insertion portion 27 is formed of a pin fixing portion 33 to which the pin 14 is fixed and an interpiece movable portion 34 to which the interpiece 15 is movably fitted. The pin movable portion 31, the portion 32a of the interpiece fixing portion 32, not including the extension portion 32b, the pin fixing portion 33 and the interpiece movable portion 34 respectively have the same shapes as those of the pin movable portion 16, interpiece fixing portion 17, pin fixing portion 18 and interpiece movable portion 19 of the random arrangement link 11. The front end arranged split piece coupling link 24 is formed to have a larger front-rear length of the link 24 as a whole in such a manner that the interpiece fixing portion extension portion 32b is added to the random arrangement link 11.

In addition, as shown in FIG. 6B, the front insertion portion 28 of the rear end arranged split piece coupling link 25 is formed of a pin movable portion 36 to which the pin 14 is movably fitted and an interpiece fixing portion 37 to which the interpiece 15 is fixed, the rear insertion portion 29 is formed of a pin fixing portion 38 to which the pin 14 is fixed and an interpiece movable portion 39 to which the interpiece 15 is movably fitted, and an extension portion 38b is added to the pin fixing portion 38 on the rear side of a body portion 38a having the same size as that of the random arrangement link 11. The pin movable portion 36, the interpiece fixing portion 37, the portion 38a of the pin fixing portion 38, not including the extension portion 38b, and the interpiece movable portion 39 respectively have the same shapes as those of the pin movable portion 16, interpiece fixing portion 17, pin fixing portion 18 and interpiece movable portion 19 of the random arrangement link 11. The rear end arranged split piece coupling link 25 is formed to have a larger front-rear length of the link 25 as a whole in such a manner that the pin fixing portion extension portion 38b is added to the random arrangement link 11.

Figure 8A:
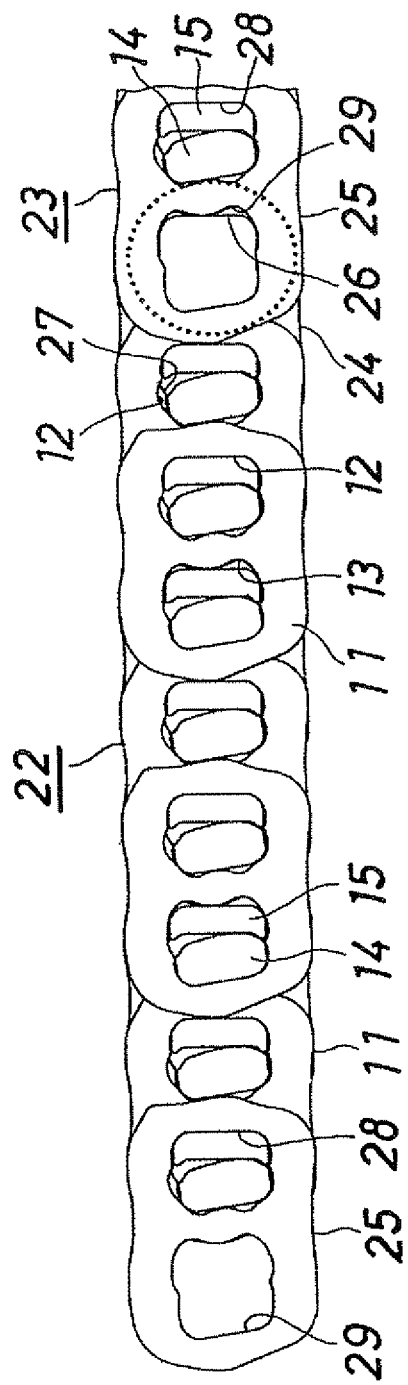
FIG. 8A is a side view that shows one step (split piece overlapping step) of the assembling method for a torque transmission chain according to the invention.
Figure 8B:
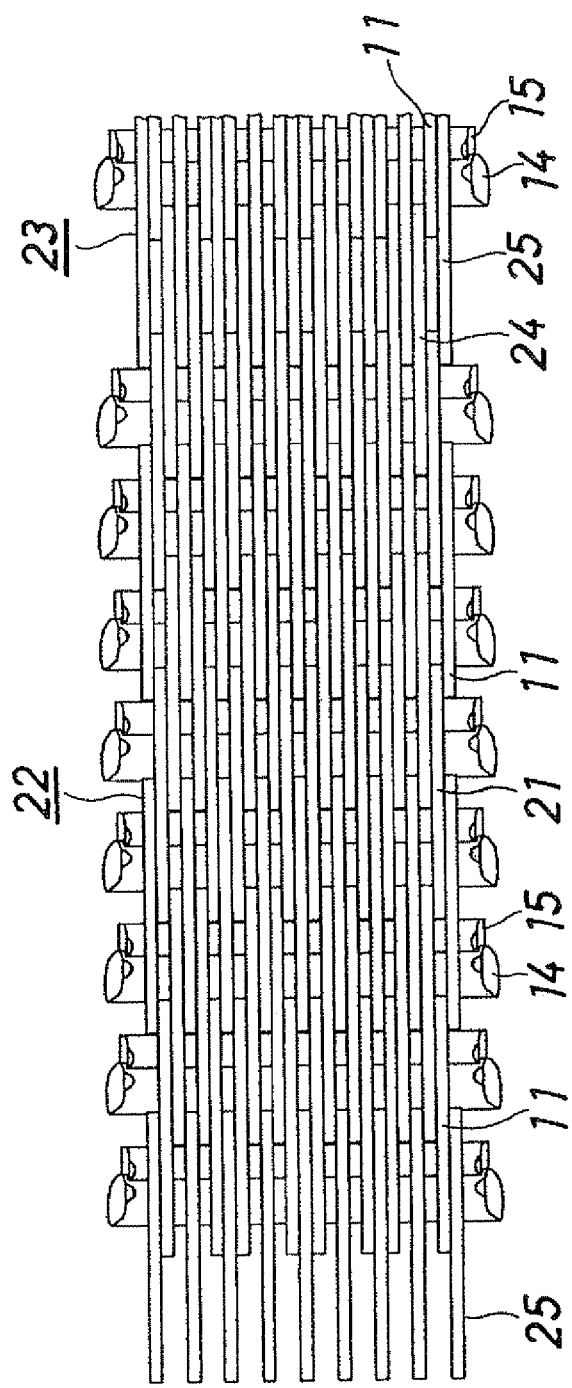
FIG. 8B is a plan view that shows one step (split piece overlapping step) of the assembling method for a torque transmission chain according to the invention.

In the split piece overlapping step shown in FIG. 8A and FIG. 8B, the split pieces 22 and 23 are linearly arranged such that the split piece coupling links 24 and 25 overlap with each other (the rear insertion portion 29 of the rear end arranged split piece coupling link 25 overlaps with the front insertion portion 26 of the front end arranged split piece coupling link 24). As shown in FIG. 8A, the one shown at the right side is the rear end arranged split piece coupling link 25, and the front end arranged split piece coupling link 24 is overlapped on the sheet back side of the rear end arranged split piece coupling link 25 such that part of the front end arranged split piece coupling link 24 can be seen.

The pin arranging step includes: a step (see FIG. 9A and FIG. 9B) of inserting the pin 14A through the overlapped split piece coupling links 24 and 25; a step (see FIG. 10A and FIG. 10B) of moving the inserted pin 14A to a predetermined position (state of being accommodated in the pin movable portion 31 of the front end arranged split piece coupling link 24 and the pin fixing portion 38 of the rear end arranged split piece coupling link 25); a step (see FIG. 11A and FIG. 11B) of further inserting the interpiece 15A through the overlapped split piece coupling links 24 and 25; and a step (see FIG. 12A and FIG. 12B) of moving the inserted interpiece 15A to a predetermined position (state of being accommodated in the interpiece fixing portion 32 of the front end arranged split piece coupling link 24 and the interpiece movable portion 39 of the rear end arranged split piece coupling link 25).

Figure 9A:
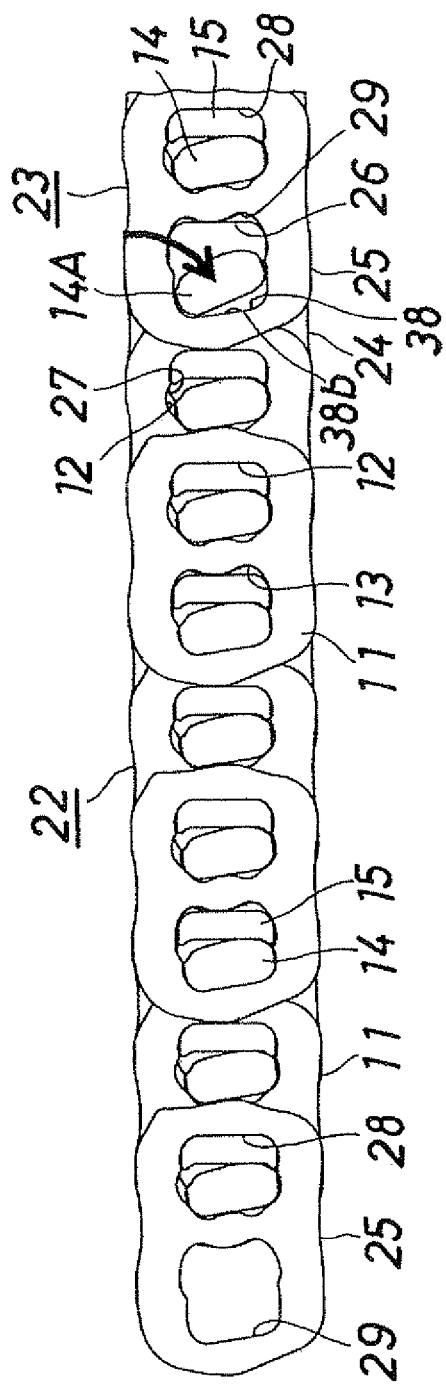
FIG. 9A is a side view that shows one step (pin inserting step) of the assembling method for a torque transmission chain according to the invention.
Figure 9B:
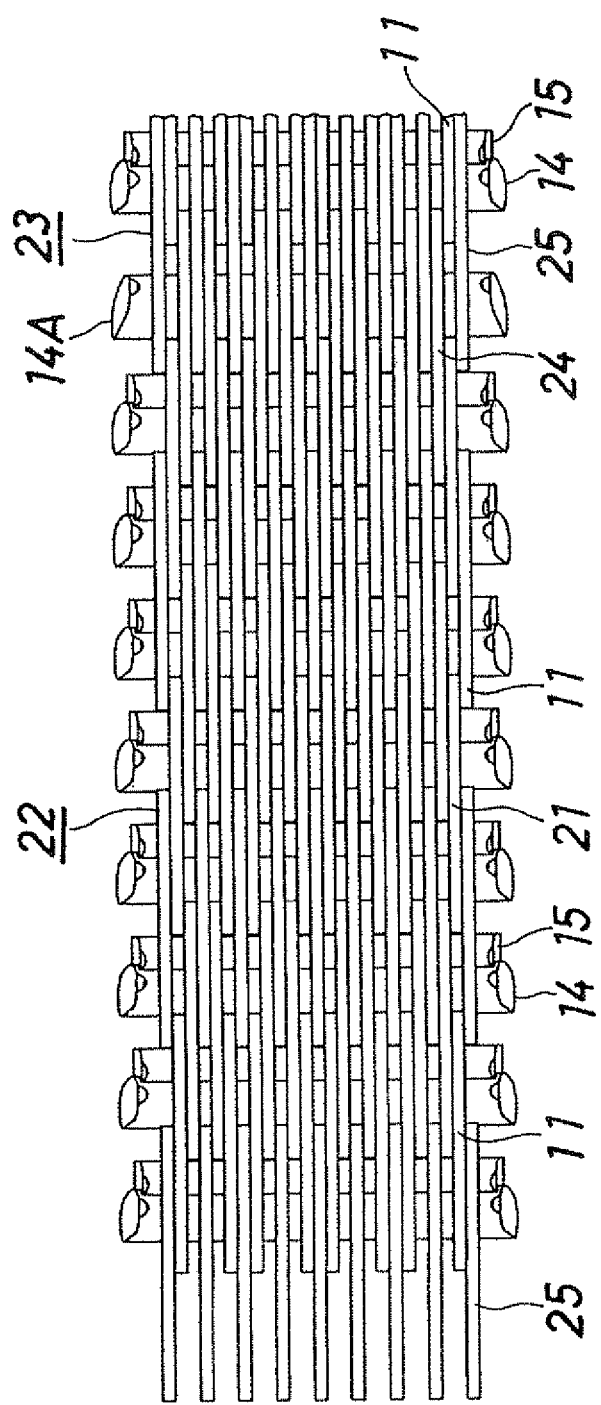
FIG. 9B is a plan view that shows one step (pin inserting step) of the assembling method for a torque transmission chain according to the invention.

In the step of inserting the pin 14A, shown in FIG. 9A and FIG. 9B, the extension portion 38b is provided at the rear side of the pin fixing portion 38 in the rear insertion portion 29 of the rear end arranged split piece coupling link 25, so the pin 14A may be inserted into the pin fixing portion 38 of the rear insertion portion 29 by inclining the pin 14A such that the upper end of the pin 14A enters the extension portion 38b of the pin fixing portion 38. By so doing, the pin 14A is also inserted in the pin movable portion 31 of the front insertion portion 26 of the front end arranged split piece coupling link 24.

Figure 10A:
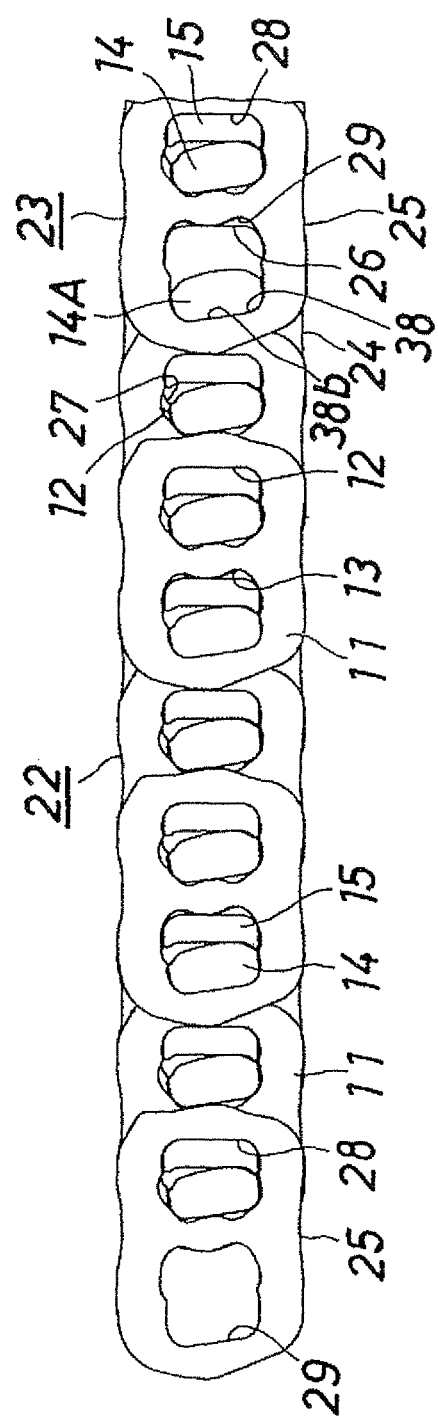
FIG. 10A is a side view that shows one step (pin arranging step) of the assembling method for a torque transmission chain according to the invention.
Figure 10B:
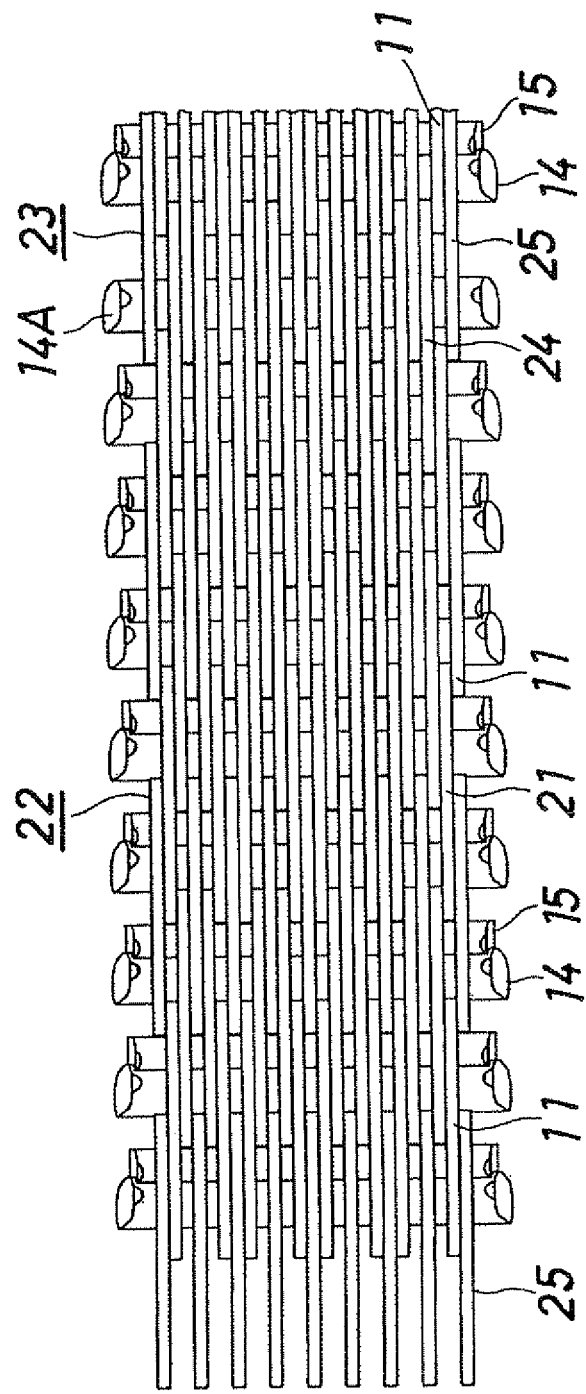
FIG. 10B is a plan view that shows one step (pin arranging step) of the assembling method for a torque transmission chain according to the invention.

In the step of arranging the pin 14A, shown in FIG. 10A and FIG. 10B, the inclined pin 14A is moved within the pin fixing portion 38 of the rear insertion portion 29 of the rear end arranged split piece coupling link 25 so as to be oriented vertically. The state that the pin 14A should be originally positioned is a state where the back surface of the pin 14A is in contact with the back surface of the pin fixing portion 38, and the pin 14A is held so as to be positioned at the extension portion 38b of the pin fixing portion 38.

Figure 11A:
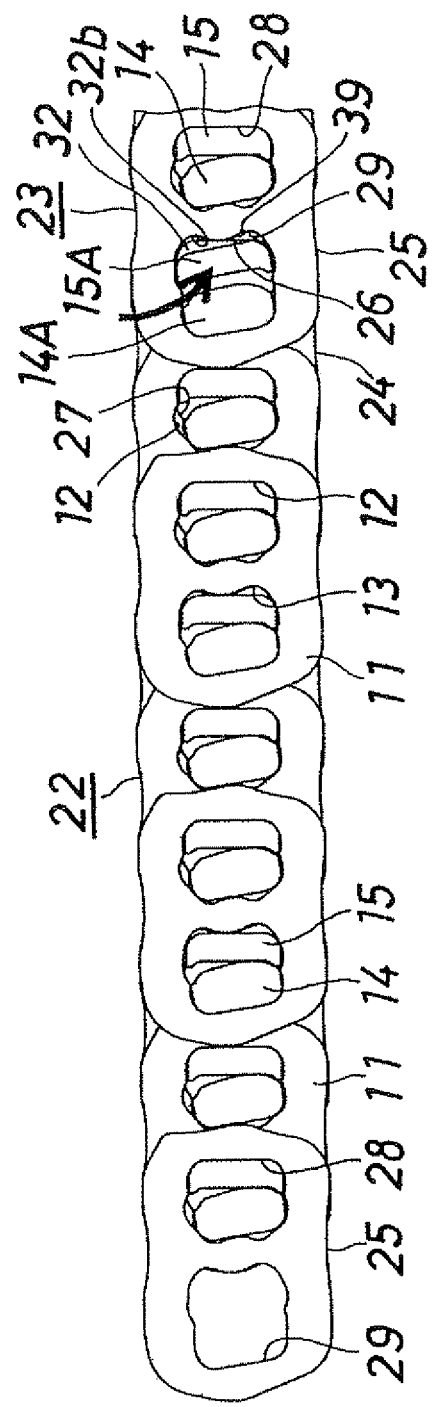
FIG. 11A is a side view that shows one step (interpiece inserting step) of the assembling method for a torque transmission chain according to the invention.
Figure 11B:
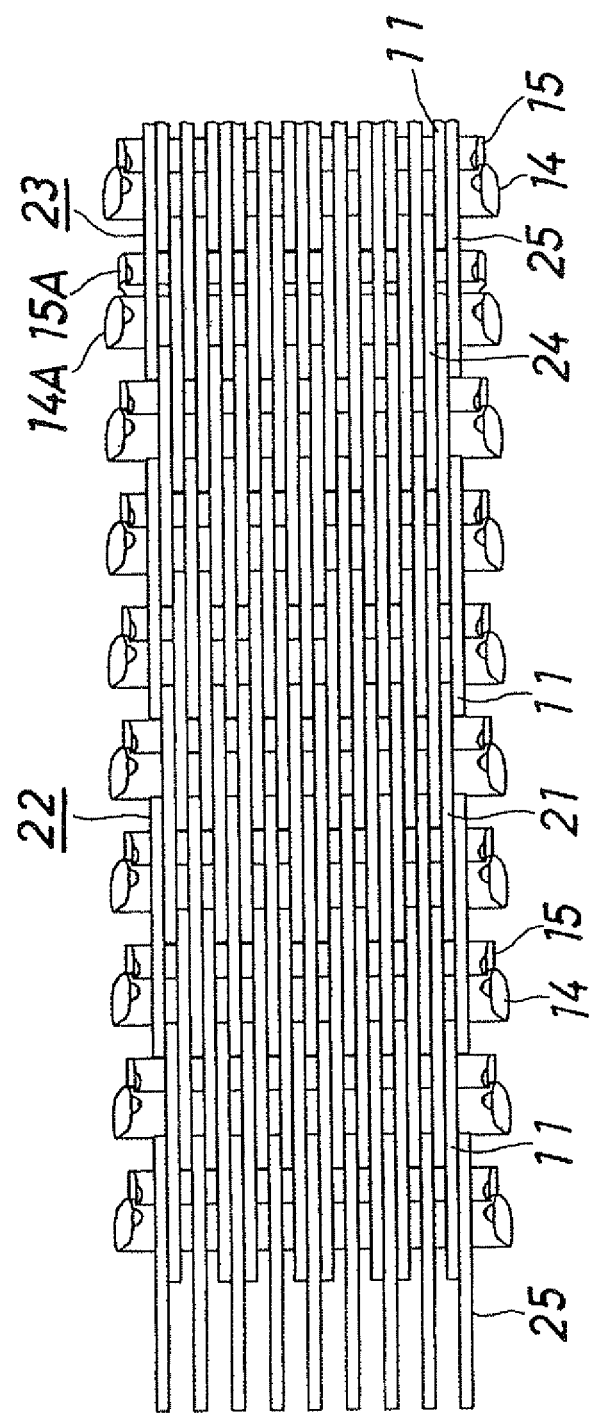
FIG. 11B is a plan view that shows one step (interpiece inserting step) of the assembling method for a torque transmission chain according to the invention.

In the step of inserting the interpiece 15A, shown in FIG. 11A and FIG. 11B, the extension portion 32b is provided at the front side of the interpiece fixing portion 32 in the front insertion portion 26 of the front end arranged split piece coupling link 24, so the interpiece 15A may be inserted into the interpiece fixing portion 32 of the front insertion portion 26 by inclining the interpiece 15A such that the lower end of the interpiece 15A enters the extension portion 32b of the interpiece fixing portion 32. By so doing, the interpiece 15A is also inserted into the interpiece movable portion 39 of the rear insertion portion 29 of the rear end arranged split piece coupling link 25.

Figure 12A:
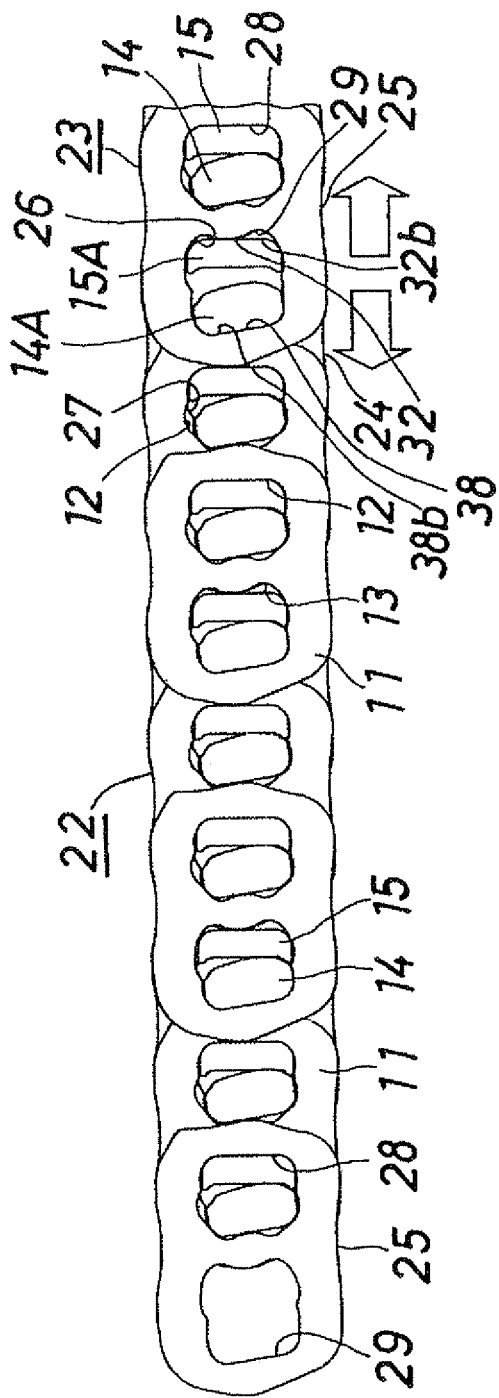
FIG. 12A is a side view that shows one step (split piece pretensioning step) of the assembling method for a torque transmission chain according to the invention.
Figure 12B:
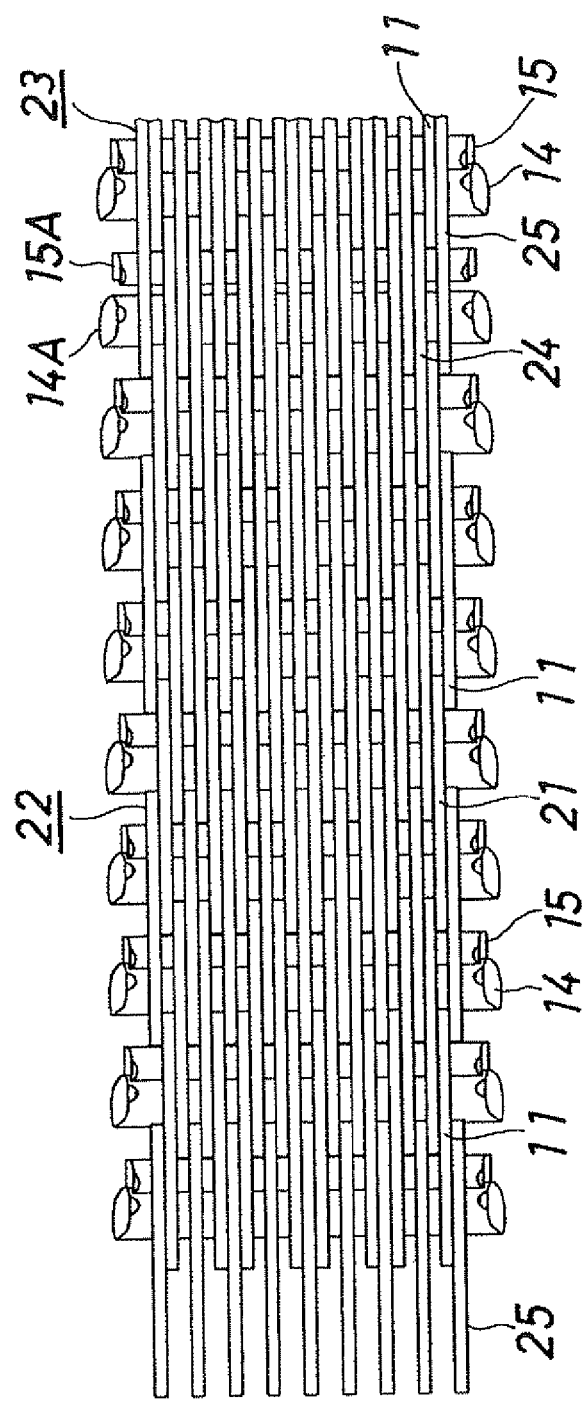
FIG. 12B is a plan view that shows one step (split piece pretensioning step) of the assembling method for a torque transmission chain according to the invention.

In the step of arranging the interpiece 15A, shown in FIG. 12A and FIG. 12B, the inclined interpiece 15A is moved within the interpiece fixing portion 32 in the front insertion portion 26 of the front end arranged split piece coupling link 24 so as to be oriented vertically. The state where the interpiece 15A should be originally positioned is a state where the back surface of the interpiece 15A is in contact with the front surface of the interpiece fixing portion 32, and the interpiece 15A is held so as to be positioned at the extension portion 32b of the interpiece fixing portion 32. As shown in the drawings, in a state where the pin 14A is positioned at the extension portion 38b of the pin fixing portion 38 and the interpiece 15A is positioned at the extension portion 32b of the interpiece fixing portion 32, there is a gap having a size corresponding to the extension portions 32b and 38b between the pin 14A and the interpiece 15A.

After that, in FIG. 12A, as indicated by the arrow, both ends of the whole of the plurality of split pieces 22 and 23 that are coupled to each other via the split piece coupling links 24 and 25 are pulled to carry out the split piece pretensioning step.

Figure 13A:
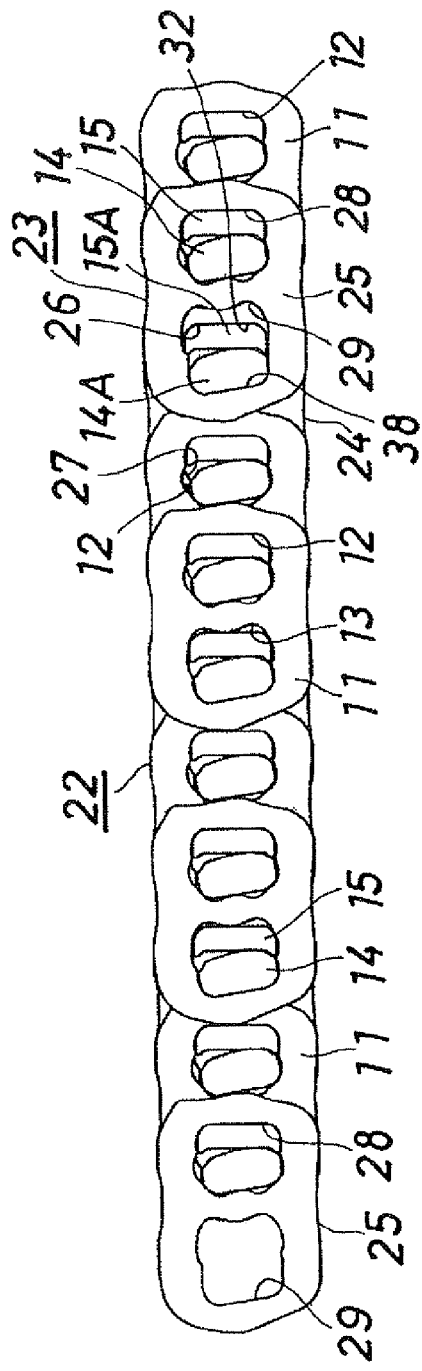
FIG. 13A is a side view that shows one step (split piece completing step) of the assembling method for a torque transmission chain according to the invention.
Figure 13B:
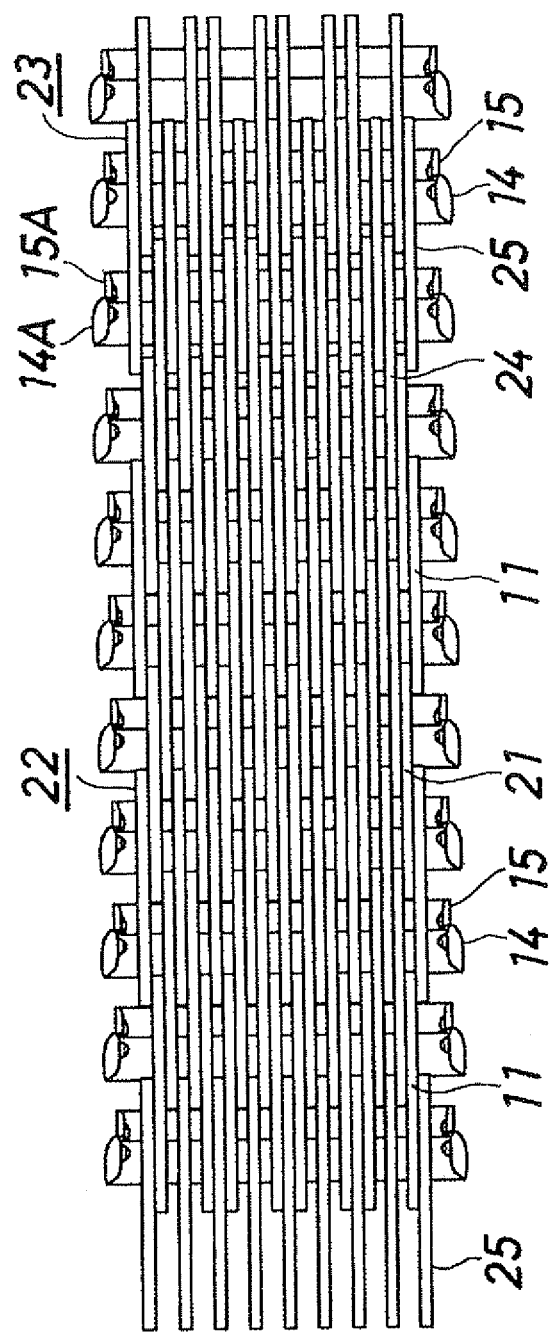
FIG. 13B is a side view that shows one step (split piece completing step) of the assembling method for a torque transmission chain according to the invention.

By so doing, the pin 14A, which is positioned at the extension portion 38b of the pin fixing portion 38 of the rear end arranged split piece coupling link 25, and the interpiece 15A, which is positioned at the extension portion 32b of the interpiece fixing portion 32 of the front end arranged split piece coupling link 24, are respectively relatively moved rightward and leftward in the drawing, and, as shown in FIG. 13A and FIG. 13B, the pin 14A and the interpiece 15A contact with each other. As a result, a tension is loaded among the pin 14A and interpiece 15A and the split piece coupling links 24 and 25 in a state where a gap is formed at the rear side of the front insertion portion 26 of the front end arranged split piece coupling link 24 and the front side of the rear insertion portion 29 of the rear end arranged split piece coupling link 25. By so doing, the pin 14A is fixedly press-fitted to the pin fixing portion 38 of the rear end arranged split piece coupling link 25, and the interpiece 15A is fixedly press-fitted to the interpiece fixing portion 32 of the rear end arranged split piece coupling link 25, and pulling force at this time is adjusted to thereby apply an appropriate pretension to the whole of the split pieces 22 and 23.

The plurality of split pieces 22 and 23 are coupled to each other as described above to create a chain having a desired length, and then the ends of the chain are coupled to each other as in the case of the above. By so doing, the endless torque transmission chain 1 is completed.

Note that the above assembling method and press-fitting device may be applied to various press-fitting-type torque transmission chains of which the pitch length (pin arrangement) is random without any limitations on the shapes of the link, pin and interpiece.

An assembling method for a torque transmission chain according to an embodiment of the invention is a method of assembling a torque transmission chain that has a plurality of links each having a pin insertion portion through which a pin is inserted and a plurality of pins that couple the links arranged in a chain widthwise direction, wherein the links have at least two pitch lengths, and the links having different pitch lengths are randomly arranged. The assembling method includes: a step of manufacturing split pieces in such a manner that the torque transmission chain is divided into a plurality of split pieces, a desired number of pins are held by a linear pin holding jig and a desired number of the links are press-fitted to the pins; a step of arranging split piece coupling links, each having a pin insertion portion larger in split piece longitudinal size than the pin insertion portions of the other links, at both ends of each split piece; a step of linearly arranging the split pieces so as to overlap the split piece coupling links; a step of inserting the pin through the overlapped split piece coupling links to arrange the pin at a desired position; and a step of pulling both ends of a whole of the plurality of split pieces coupled to each other via the split piece coupling links to fix the pin in the pin insertion portions of the split piece coupling links to thereby apply a pretension to the whole.

There is one method of manufacturing an endless torque transmission chain that uses a disc-shaped pin holding jig having a desired number of pin insertion holes into which the ends of the pins are insertable and link pressing jigs that push the links to predetermined positions of the pins. When the torque transmission chain in which the links have at least two pitch lengths and the links having different pitch lengths are randomly arranged is manufactured, the pin insertion holes that agree to random arrangement are formed in the pin holding jig. Here, for example, when the arrangement position of one link is changed, the overall length of the chain does not change; however, link arrangement changes, so it is necessary to manufacture a new pin holding jig. The pin holding jig needs to accurately obtain a pin interval (pitch length) in a completed endless chain, and cost and effort are required to manufacture the pin holding jig. On the other hand, changing the link arrangement without varying the overall length of the chain is an effective design method in terms of noise reduction, or the like, and an assembling method to which arrangement is freely changed is sought.

Then, in the assembling method for a torque transmission chain according to the embodiment of the invention, an endless chain is not manufactured using a disc-shaped pin holding jig, and initially the torque transmission chain is divided into the plurality of split pieces, the pins are held by the linear pin holding jig and the links are press-fitted to the pins to thereby manufacture each of the split pieces. The number of the split pieces is not specifically limited, and is set to an adequate number, that is, about three to ten. Each of the split pieces has desired link arrangement, and the split pieces normally have link arrangements different from each other. In order to obtain the split pieces, a linear pin holding jig having a desired number of pin insertion holes into which ends of the pins are insertable and a link pressing jig that presses each link to predetermined positions of the pins just need to be used to sequentially press-fit the links to the pins held by the pin holding jig. In this case, it is difficult to couple the split pieces using the same links as those of the existing art, so split piece coupling links are used to couple the split pieces. In order to easily insert the pins, each split piece coupling link has a pin insertion portion having a larger split piece longitudinal size than the pin insertion portions of the other link. By so doing, the pin may be moved and rotated within the pin insertion portions of the split piece coupling links, and the pin is rotated by a desired angle at a predetermined position after insertion to thereby make it possible to arrange the pin at an original position. At this stage, the split piece coupling links and the pins are not fixed, so, after that, both ends of the whole of the plurality of split pieces coupled to each other via the split piece coupling links are pulled to forcibly cause the pins to be aligned along the corresponding pin insertion portions to thereby fix the split piece coupling links and the pins. By so doing, the pin is fixed at an original position in the pin insertion portions of the split piece coupling links, and an adequate pretension is applied to the whole of the chain formed of the plurality of split pieces.

In the step of manufacturing the split pieces, each pin is supported by a linear pin holding jig vertically or horizontally. The links are press-fitted using a pressing machine. The links may be press-fitted one by one or may be press-fitted in units of multiple sheets, and, in addition, all the links arranged in the chain widthwise direction may be press-fitted at the same time. The split pieces normally respectively have different link arrangements (may include the split pieces having the same arrangement), while a plurality of types of linear pin holding jigs having different link arrangements are prepared. The pin holding jigs and the split pieces need not be in a one-to-one correspondence with each other. For example, it is applicable that No. 1 to No. 8 pin insertion holes of a pin holding jig are used to manufacture a first split piece and No. 5 to No. 12 pin insertion holes of the pin holding jig are used to manufacture a second split piece.

The above assembling method is suitable to manufacture various torque transmission chains that require press-fitting; however, it is further suitable to manufacture a torque transmission chain that has a plurality of links having front and rear insertion portions as a pin insertion portion and a plurality of first pins and a plurality of second pins that are arranged one behind the other and that couple the links that are arranged in a chain widthwise direction such that the front insertion portion of one of the links corresponds to the rear insertion portion of another one of the links and in which the first pins and the second pins relatively move in rolling contact with each other to thereby allow the links to bend in a chain longitudinal direction, one of each first pin and each second pin is fixed to the front insertion portion of one of the links and is movably fitted to the rear insertion portion of another one of the links, and the other one is movably fitted to the front insertion portion of one of the links and is fixed to the rear insertion portion of another one of the links. In this case, press-fitting is desirably performed at edges (upper and lower edges) of portions perpendicular to the chain longitudinal direction of each insertion portion.

In the above torque transmission chain, at least one of each first pin and each second pin contacts with a pulley to transmit torque by friction force. In the chain in which any one of the pins contacts with the pulley, any one of each first pin and each second pin is used as a pin (hereinafter, referred to as "first pin" or "pin") that contacts with the pulley when the chain is used in a continuously variable transmission, and the other one is used as a pin (referred to as interpiece or strip; and hereinafter, referred to as "second pin" or "interpiece") that does not contact with the pulley.

In this case, all the links, including the split piece coupling links, each have front and rear insertion portions through which pairs of pin and interpiece are respectively inserted, each pin is fixed to a pin fixing portion provided at a rear-side portion of the rear insertion portion of one of the links and is movably fitted to a pin movable portion provided at a rear-side portion of the front insertion portion of another one of the links, and each interpiece is fixed to an interpiece fixing portion provided at a front-side portion of the front insertion portion of one of the links and is movably fitted to an interpiece movable portion provided at a front-side portion of the rear insertion portion of another one of the links. Then, the front insertion portion of the split piece coupling link arranged at a front end of each split piece has an interpiece fixing portion extension portion that is provided at a back surface side (surface opposite to the rolling contact surface) of the interpiece fixing portion in addition to the front insertion portion (the pin movable portion and the interpiece fixing portion) provided for another one of the links, and the rear insertion portion of the split piece coupling link arranged at a rear end of each split piece has a pin fixing portion extension portion provided at a back surface side (surface opposite to the rolling contact surface) of the pin fixing portion in addition to the rear insertion portion (the pin fixing portion and the interpiece movable portion) provided for another one of the links. Then, initially, each pin is inclined and loosely inserted into the pin fixing portion and the pin movable portion and is then moved along the pin fixing portion while the pin is being rotated, and, subsequently, the interpiece is inclined and loosely inserted into the interpiece fixing portion and the interpiece movable portion and is then moved along the interpiece fixing portion while the interpiece is being rotated. By so doing, each pin and each interpiece are arranged at their original positions.

In a completed product after the split piece pretensioning step, the pin is in rolling contact with the interpiece in a state where the pin is press-fitted to the pin fixing portion of one of the split piece coupling links and the interpiece is press-fitted to the interpiece fixing portion of the other one of the split piece coupling links, so gaps are formed on the movable portion sides of the insertion portions having the pin fixing portion extension portion and the interpiece fixing portion extension portion.

In the above description, each link is, for example, made of spring steel or carbon tool steel. The material of each link is not limited to spring steel or carbon tool steel; of course, it may be another steel, such as bearing steel. The front and rear insertion portions of each link may be independent through holes (link having a pillar), or the front and rear insertion portions may be formed of a single through hole (link having no pillar). An appropriate steel, such as bearing steel, is used as the material of each pin.

With the assembling method for a torque transmission chain according to the embodiment of the invention, the torque transmission chain is divided into a plurality of split pieces, each split piece is manufactured using a linear pin holding jig and then the split pieces are coupled to each other to thereby make it possible to form an endless chain, so, even when it is required to change the arrangement of the links, it is not necessary to change the whole of the pin holding jigs to a new one. Thus, it is possible to increase the efficiency of assembling man-hour to thereby improve workability.

DESCRIPTION OF REFERENCE NUMERALS 1 torque transmission chain
11 link
12 front insertion portion (pin insertion portion)
13 rear insertion portion (pin insertion portion)
14 pin (first pin)
15 interpiece (second pin)
22, 23 split piece
24 front end arranged split piece coupling link
25 rear end arranged split piece coupling link
26 front insertion portion (pin insertion portion)
27 rear insertion portion (pin insertion portion)
28 front insertion portion (pin insertion portion)
29 rear insertion portion (pin insertion portion)
43 pin holding jig

The invention claimed is:

1. A method of assembling a torque transmission chain that has a plurality of links each having a pin insertion portion through which a pin is inserted and a plurality of pins that couple the links arranged in a chain widthwise direction, wherein the links have at least two pitch lengths, and the links having different pitch lengths are randomly arranged, comprising:
   a step of manufacturing split pieces of the chain in such a manner that a desired number of pins are held by a linear pin holding jig and a desired number of the links are press-fitted to the pins;
   a step of linearly arranging the split pieces so as to overlap split piece coupling links each arranged at any one of both ends of each of the split pieces;
   a step of inserting the pin through the overlapped split piece coupling links; and
   a step of pulling both ends of a whole of the plurality of split pieces coupled to each other via the split piece coupling links to thereby fix the pin to a pin fixing portion of the split piece coupling links.

2. The assembling method for a torque transmission chain according to claim 1, wherein the pin insertion portions of the split piece coupling links are larger in size in a split piece longitudinal direction than the pin insertion portion of each of the other links so that the pin is insertable in an inclined state.

3. The assembling method for a torque transmission chain according to claim 1, wherein pretensioning is performed by pulling both ends of each of the split pieces.

4. The assembling method for a torque transmission chain according to claim 2, wherein pretensioning is performed by pulling both ends of each of the split pieces.

* * * * *